United States Patent
Sammarco

(10) Patent No.: US 7,694,322 B2
(45) Date of Patent: Apr. 6, 2010

(54) EFFICIENT STREAMED CONTENT DELIVERY TO PORTABLE COMMUNICATIONS DEVICE

(75) Inventor: Anthony J. Sammarco, Garner, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 962 days.

(21) Appl. No.: 11/306,218

(22) Filed: Dec. 20, 2005

(65) Prior Publication Data

US 2007/0143797 A1 Jun. 21, 2007

(51) Int. Cl.
*H04N 7/173* (2006.01)

(52) U.S. Cl. .............................. 725/93; 725/86; 725/88; 725/105; 725/62; 725/91; 725/94

(58) Field of Classification Search .................... 725/86, 725/91, 93, 94, 97
See application file for complete search history.

(56) References Cited

U.S. PATENT DOCUMENTS

| 7,150,017 | B1 * | 12/2006 | Vogl et al. ................... | 718/102 |
| 2002/0122080 | A1 | 9/2002 | Kunii et al. | |
| 2002/0199200 | A1 * | 12/2002 | Addington .................... | 725/97 |
| 2004/0148638 | A1 * | 7/2004 | Weisman et al. ............. | 725/115 |
| 2006/0184977 | A1 * | 8/2006 | Mueller et al. ................ | 725/86 |

FOREIGN PATENT DOCUMENTS

EP 1217769 6/2002
EP 1217769 A1 6/2002

OTHER PUBLICATIONS

Sony Ericsson Mobile Communications AB, International Preliminary Report on Patentability, corresponding to International Patent Application No. PCT/US06/031804, dated Mar. 31, 2008.
Sony Ericsson Mobile Communications AB, International Application Ser. No. PCT/US2006/031804, "International Search Report", Dec. 6, 2006.
Sony Ericsson Mobile Communications AB, International Application Ser. No. PCT/US2006/031804, "Written Opinion", Dec. 6, 2006.
Chinese Patent Office, First Office Action, Jan. 8, 2010, pp. 1-9, State Intellectual Property Office, P.R. China, Beijing, China.

\* cited by examiner

*Primary Examiner*—Christopher Kelley
*Assistant Examiner*—Timothy R Newlin
(74) *Attorney, Agent, or Firm*—R. Brian Drozd; Moore & Van Allen PLLC

(57) ABSTRACT

Described is a system and method of receiving content on a portable mobile communications device from a mobile TV service provider. A mobile pointer record is created and stored within the portable mobile communications device that contains data that identifies content to be delivered from the mobile TV service provider. The mobile pointer record data is sent to a content server maintained by the mobile TV service provider where a corresponding content server pointer record is created and stored such that the mobile TV service provider associates the content server pointer record with stored content. When desired, a request is sent to the mobile TV service provider from the portable mobile communications device by selecting the desired mobile pointer record for the content. The mobile TV service provider identifies the content via the corresponding content server pointer record and delivers the requested stored content to the portable mobile communications device.

14 Claims, 6 Drawing Sheets

Mobile Device Pointer Record:

{Viewer_ID; Channel_ID; Program Name; Pointer_Number; Start_Time; Stop_Time}

Content Server Pointer Record:

{Viewer_ID; Channel_ID; Pointer_Number; Start_Time; Stop_Time}

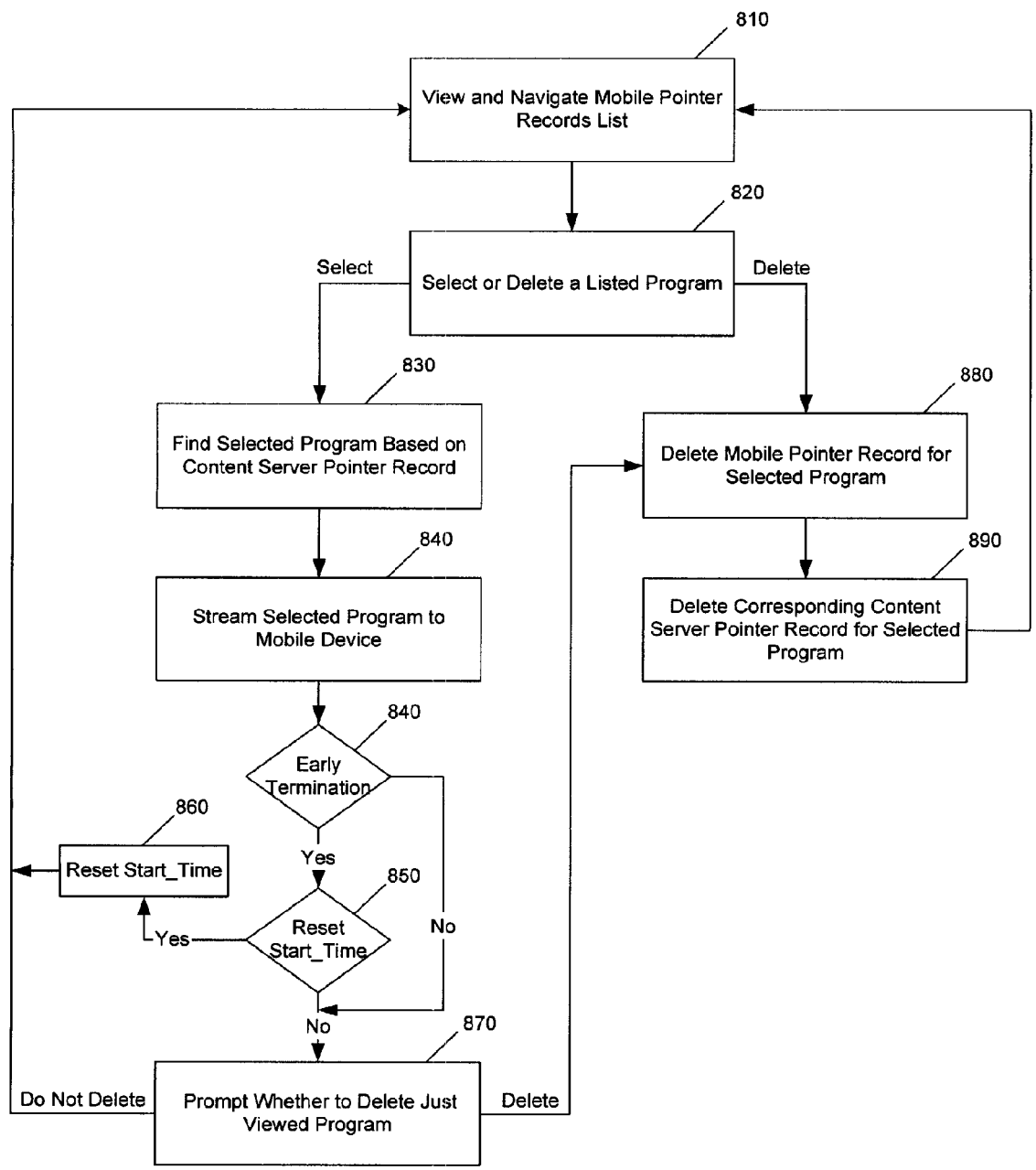

EFFICIENT STREAMED CONTENT DELIVERY TO PORTABLE COMMUNICATIONS DEVICE

BACKGROUND OF THE INVENTION

The present invention relates to portable mobile communications devices and systems, and more particularly to a portable mobile communications device, system and method that can efficiently deliver audio/video content from a mobile TV service provider to a portable mobile communications device.

Portable mobile communications devices such as mobile phones are becoming more sophisticated and include many new features and capabilities. One such feature is the capability to receive mobile broadcast signals, mobile television, or the like. Such services include digital video broadcast-handheld (DVB-H), digital media broadcast (DMB), integrated services digital broadcast-terrestrial (ISDB-T), mobile broadcast multi-cast service (MBMS), or similar technologies. When integrated into a mobile phone, all of the aforementioned technologies utilize a separate mobile broadcast tuner except for MBMS which can be received using the portable mobile communications device existing mobile radio receiver and transmitter.

A third party provider maintains the content or programs that can be viewed by a portable mobile communications device such as a mobile TV equipped mobile phone. This content is made available to subscribers similar to a television network schedule. Thus, a viewer/subscriber can tune in to the content currently being broadcast. Unfortunately, this scheme only allows a viewer to see what is currently being broadcast or streamed. It does not provide for time shifting of viewing in which a viewer can watch a program that has already aired or preserve the ability to watch a future program just not at its originally scheduled broadcast time.

Currently, there are no provisions addressing the user's dilemma described above. What is needed is a mechanism that allows the viewer to selectively reserve the ability to watch programs on a time shifted basis that suits the viewer's schedule without having to use significant memory resources to actually store the desired content.

BRIEF SUMMARY OF THE INVENTION

The present invention describes a system and method of receiving content on a portable mobile communications device from a mobile TV service provider. A mobile pointer record is created and stored within the portable mobile communications device. The mobile pointer record contains data that identifies content to be delivered from the mobile TV service provider to the portable mobile communications device. The mobile pointer record data is sent to a content server maintained by the mobile TV service provider where a corresponding content server pointer record is created and stored such that the mobile TV service provider can associate the content server pointer record with stored content. When desired, a request is sent to the mobile TV service provider from the portable mobile communications device by selecting the desired mobile pointer record for the content. The mobile TV service provider identifies the content via the corresponding content server pointer record and delivers the requested stored content to the portable mobile communications device.

The mobile pointer record includes data records that identify the portable mobile communications device, a channel associated with the content, a program name for the content, a pointer number, a start time for when the content is scheduled to be delivered, and a stop time for when the content is scheduled to complete delivery. The content server pointer record includes data records that identify the portable mobile communications device, the channel associated with the content, a pointer number, a start time for when the content is scheduled to be delivered, and a stop time for when the content is scheduled to complete delivery.

In one embodiment, the mobile pointer record is created, in part, by selecting the content from an electronic program guide, wherein the electronic program guide supplies the program name data, channel data, start time, and stop time for the selected content.

In another embodiment, the mobile pointer record is created, in part, by receiving, via a user interface, input that identifies the channel associated with the content, a program name for the content, a start time identifying when the content is desired to begin delivery, and a stop time identifying when the content is desired to complete delivery.

In addition, a mobile pointer record can be created in the portable mobile communications device for the remainder of content that is currently being displayed prior to terminating the current display of content for when a user/viewer must stop viewing the content for whatever reason.

BRIEF DESCRIPTION OF THE DRAWINGS

FIG. 8 is a flow chart describing a method of manipulating pointers in accordance with an embodiment of the present invention.

DETAILED DESCRIPTION OF THE INVENTION

Figure 1:
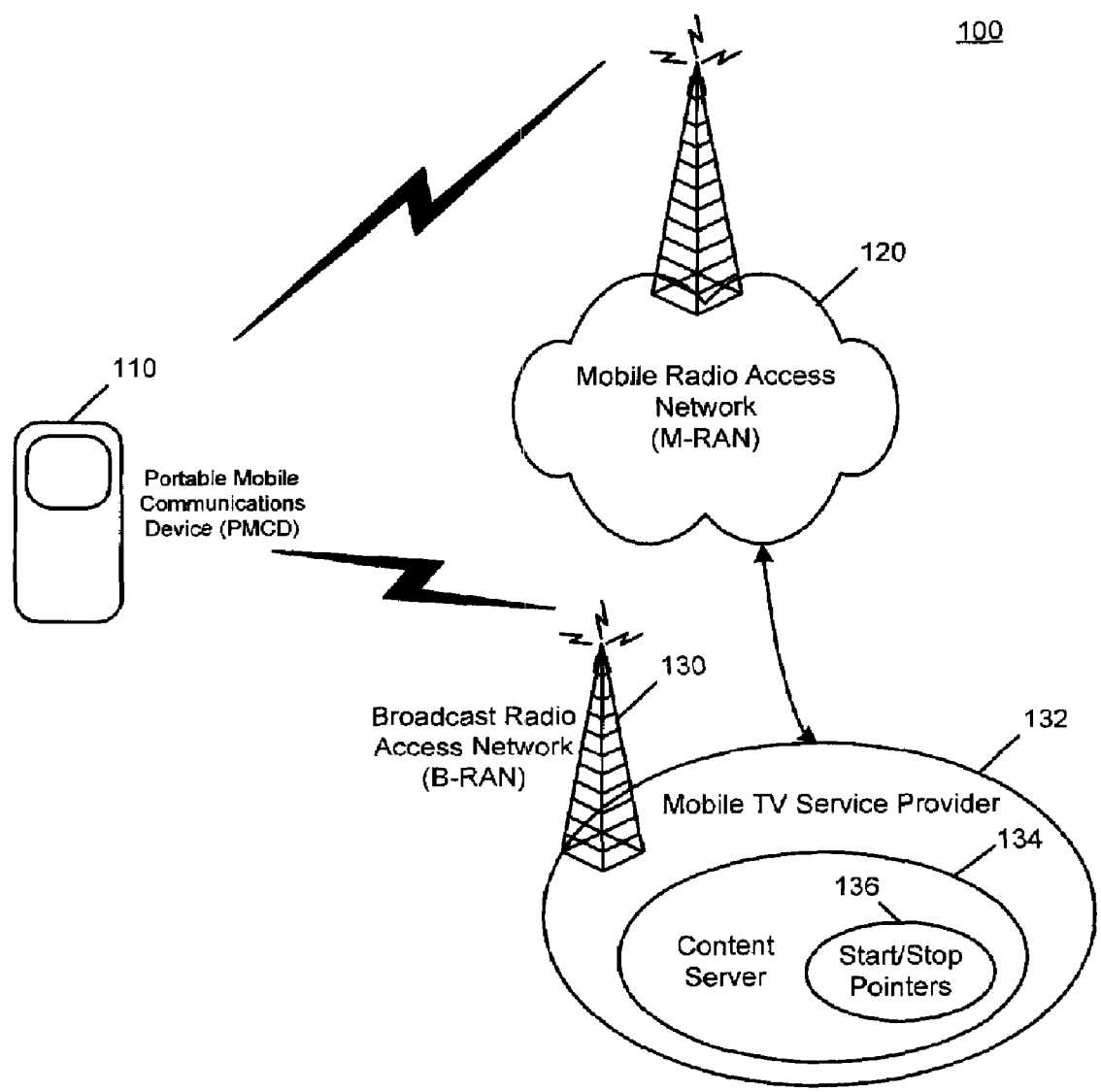
FIG. 1 is a block diagram of an exemplary system for efficiently delivering content to a mobile TV device.

FIG. 1 is a block diagram of an exemplary system for controlling the destination of broadcast mobile television signals in accordance with an embodiment of the present invention. The system 100 may be a multimedia broadcast multi-cast system (MBMS) or the like. The portable mobile communications device 110 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. The design of the portable mobile communications device 110 illustrated in FIG. 2 is for purposes of explaining the present invention and the present invention is not limited to any particular design.

Figure 2:
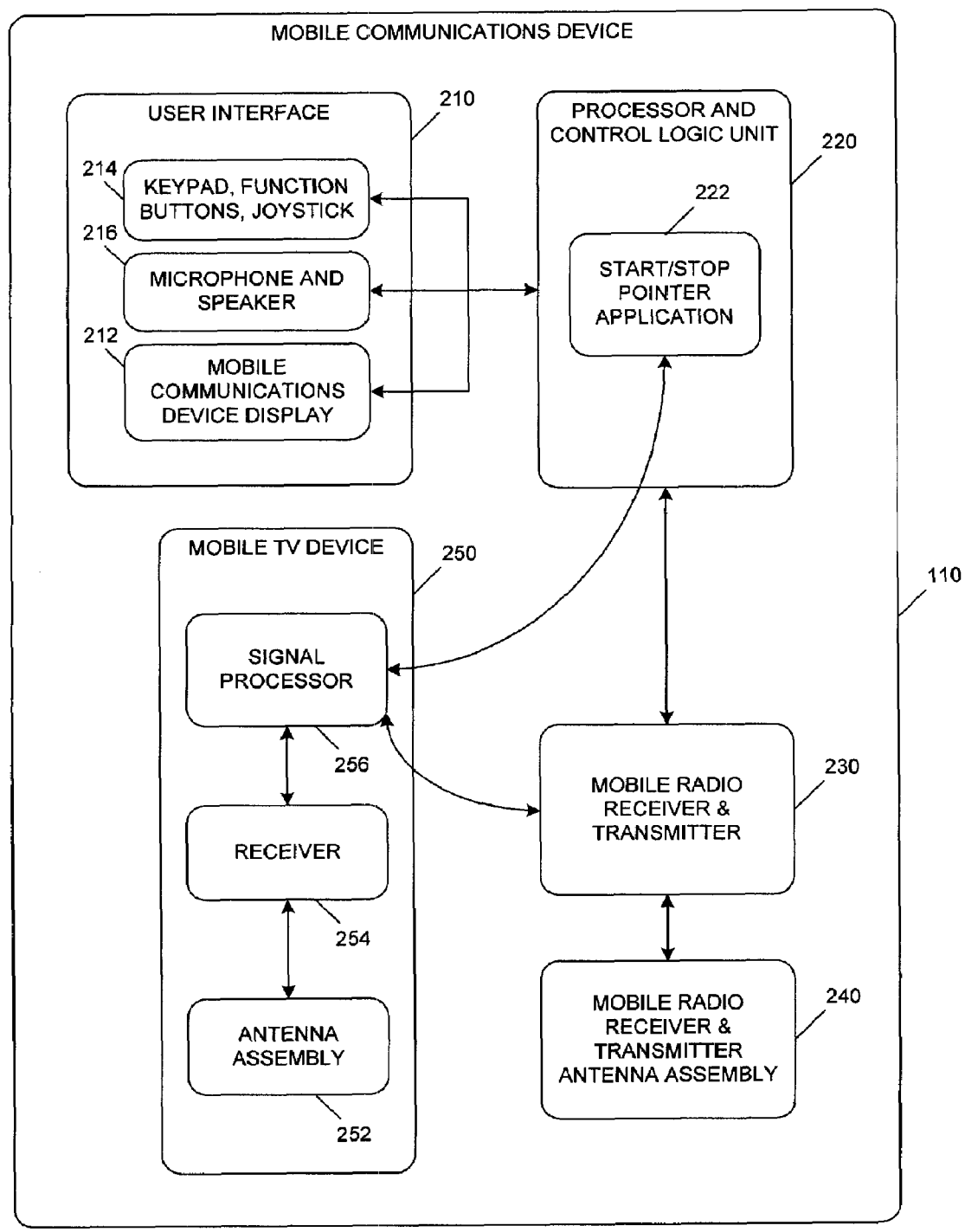
FIG. 2 is a block diagram of an exemplary portable mobile communications device for use within the system of FIG. 1 for efficiently delivering content to a mobile TV device.

The portable mobile communications device 110 shown in FIG. 2 may include an operator or user interface 210 to facilitate controlling operation of the portable mobile communications device 110 including initiating and conducting phone calls and other communications. The user interface 210 may include a display 212 to provide visual signals to a subscriber or user as to the status and operation of the portable mobile communications device 110. The display 212 may be a liquid crystal display (LCD) or the like capable of presenting color images. The display 212 may provide information to a user or operator in the form of images, text, numerals, characters, a graphical user interface (GUI) and the like. The display 212 may also be used to present programming carried by the broadcast signals described with respect to method 400 of FIG. 4.

The user interface 212 may also include a keypad and function keys or buttons 214 including a pointing device, such as a joystick or the like. The keypad, function buttons and joystick 214 permit the user to communicate commands to the portable mobile communications device 110 to dial phone numbers, initiate and terminate calls, establish other communications, such as access to a mobile TV provider, the Internet, send and receive email, text messages and the like. The keypad, function buttons and joystick 214 may also be used to control other operations of the portable mobile communications device 110. The keypad, function buttons and joystick 214 may also be implemented on a touch sensitive display adapted to receive tactile input.

The display 212, keypad, and function buttons 214 may be coupled to a main processor and control logic unit 220. The processor and control logic unit 220 may be a microprocessor or the like. The processor and logic unit 220 may include an application 222 to set start and stop pointers corresponding to a mobile TV service provider.

The user interface 210 may also include a microphone and a speaker 216. The microphone 216 may receive audio or acoustic signals from a user or from another acoustic source. The microphone 216 may convert the audio or acoustic signals to electrical signals. The microphone 216 may be connected to the processor and logic unit 220 wherein the processor and logic unit 220 may convert the electrical signals to baseband communication signals. The processor and control logic unit 220 may be connected to a radio transmitter 230 that may convert baseband signals from the processor and control logic unit 220 to radio frequency (RF) signals. The radio transmitter 230 may be connected to an antenna assembly 240 for transmission of the RF signals to a communication medium or system, such as a mobile radio access network (MRAN) 120 or the like.

The antenna assembly 240 may receive RF signals over the air and transfer the RF signals to a radio receiver 230. The radio receiver 230 may convert the RF signals to baseband signals. The baseband signals may be applied to the processor and control logic unit 220 which may convert the baseband signals to electrical signals. The processor and control unit 220 may send the electrical signals to the speaker 216 which may convert the electrical signals to audio signals that can be understood by the user.

The portable mobile communications device 110 may also include a mobile TV device 250. The mobile TV device 250 may be a DVB-H type device or the like. The mobile TV device 250 may be integrally formed as part of the portable mobile communications device 110 or may be a separate unit that may be connected and operate in association with the portable mobile communications device 110. The mobile TV device 250 may include an antenna assembly 252 for receiving broadcast signals of programming from a mobile TV broadcast network, broadcast radio access network (B-RAN) 130 or the like. A receiver 254 may be coupled to the antenna assembly 252 to receive the broadcast signals. A signal processor 256 may receive the broadcast signals from the receiver 254 and convert the signals to a format for presentation on the display 212 of the portable mobile communications device 110. Or, a signal processor 230 may receive the broadcast signals from the receiver 254 and convert the signals to a format for presentation on the display 212 of the portable mobile communications device 110.

The B-RAN 130 may originate the mobile TV or DVB-H broadcast signals for broadcasting to communications devices or mobile TV devices, such as portable mobile communications device 110 and mobile TV device 250. The B-RAN 130 may include a transmitter to transmit the broadcast signals.

The B-RAN 130 may be connected to a mobile TV service provider 132. The mobile TV service provider 132 may originate programming for broadcasting to portable mobile communications devices 110 or mobile TV devices 250 via the B-RAN 130. The mobile TV service provider 132 may include a content server 134. The content server 134 may include a start/stop pointer application 136 for indexing into the library of stored content according to specific viewer selections.

Figures 3, 4:
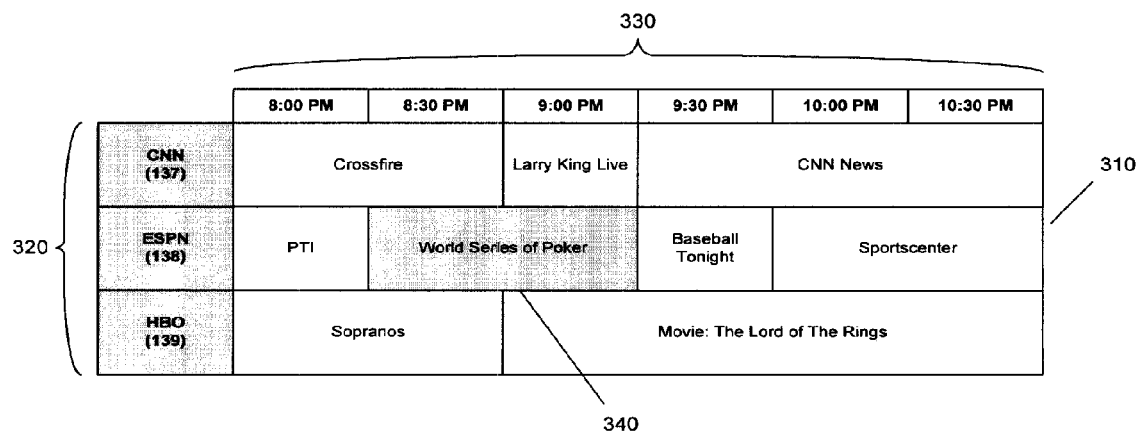
FIG. 3 is a block diagram illustrating one embodiment of a programming channel.
FIG. 4 illustrates pointer records in accordance with an embodiment of the present invention.

FIG. 3 is a block diagram illustrating one embodiment of a programming channel display 310 sometimes known as an electronic program guide (EPG). The programming channel display 310 is set up as a table with channel identifiers 320 as rows and time slots 330 as columns. In the present example, CNN, ESPN, and HBO form the rows 320 while the time slots 330 range from 8:00-11:00 PM. Individual programs are displayed according to the network schedule of the channels. This example shows the program "World Series of Poker" on ESPN between 8:30-9:30 PM highlighted 340 indicating that the user/viewer has navigated the user interface to select that program.

FIG. 4 illustrates pointer records in accordance with an embodiment of the present invention. Once the user/viewer selects a program indicating that he wishes to reserve the ability to view the program at a later date, the portable mobile communications device's start/stop pointer application creates a portable mobile communications device pointer record to ensure that the program is reserved for viewing. For the selection indicated in FIG. 3, the start/stop pointer application will create a portable mobile communications device pointer record 410 that contains the following records: viewer identification means; a channel identifier; a program name string; a pointer number; and a start_time and stop_time. The viewer identification means lets the content server know where to send the content once it is requested and also who is to be billed for any fees associated with the service. The channel identifier tells the content server which channel or network this pointer refers to. The program name string provides the name of the program to be displayed by the user interface when appropriate. The pointer number record serves to keep track of each pointer created by the portable mobile communications device. The start_time and stop_time records allow the user/viewer to designate that only a portion of a program be stored. If the start_time and stop_time records are left blank, the start/stop pointer application will assume that the entire program is wanted and will derive the start_time and stop_time from an electronic program guide.

In addition to a portable mobile communications device pointer record, a corresponding content server pointer record 420 is created. The start/stop pointer application will send the portable mobile communications device pointer record to the content server so that it can create its own content server pointer record that contains the following records: viewer identification means; a channel identifier; pointer number; a start_time; and a stop_time.

Figure 5:
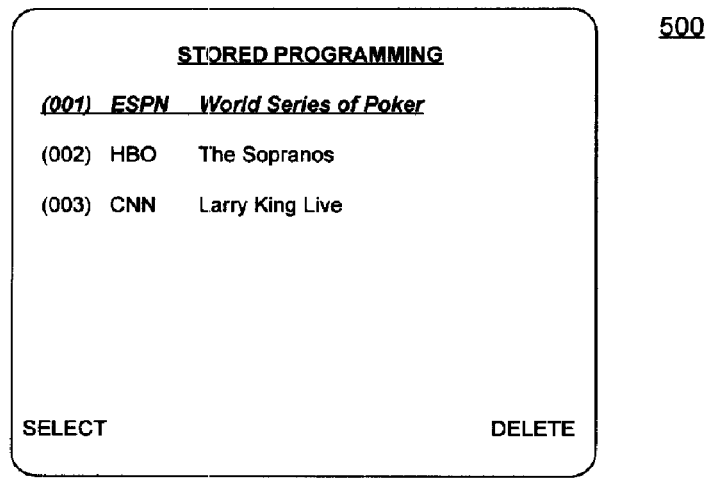
FIG. 5 is a block diagram illustrating a portable mobile communications device display of stored programming.

FIG. 5 is a block diagram illustrating a portable mobile communications device display of stored programming 500. When a user/viewer wants to watch one of the programs he has designated for later viewing, he first navigates the start/stop pointer application to a "Stored Programming" screen (or the like). This screen displays the programs currently available to view even though they have already aired live. In this example, the viewer can select from three stored programs. The programs in the list do not actually represent content that is stored locally. Rather, the list is comprised of pointers that when selected can find the stored content on the content server and request that it be delivered. This viewer has 'saved' three programs as identified by their pointer number, channel identifier, and program name. The viewer has selected ESPN World Series of Poker in this case as evidenced by the selection appearing in bold and underlined. When the user confirms this selection, the portable mobile communications device will request that the program be delivered from the content server to the portable mobile communications device.

The user/viewer can also delete pointers from this list if he so chooses by selecting the 'delete' option shown in the lower right of the screen display. This will cause the pointer record to be deleted from the portable mobile communications device and cause a request to be sent to the content server to delete the corresponding pointer record maintained by the content server's start/stop pointer application.

It should also be noted that descriptions of the appearances of menus, lists, screen shots, and the like are merely illustrative. One of ordinary skill in the art can change the 'look and feel' of the user interface without affecting the scope of the present invention.

Sometimes a user/viewer will be watching a program (either live or reserved) and have to stop watching for one reason or another. If this occurs, the start/stop pointer application will prompt the user/viewer if he wishes to reset the start_time to the point where current viewing was terminated. This allows the user/viewer to resume the program at a later date from the point where he left off. Thus, he does not have to begin again just to see the remainder of the program.

Figure 6:
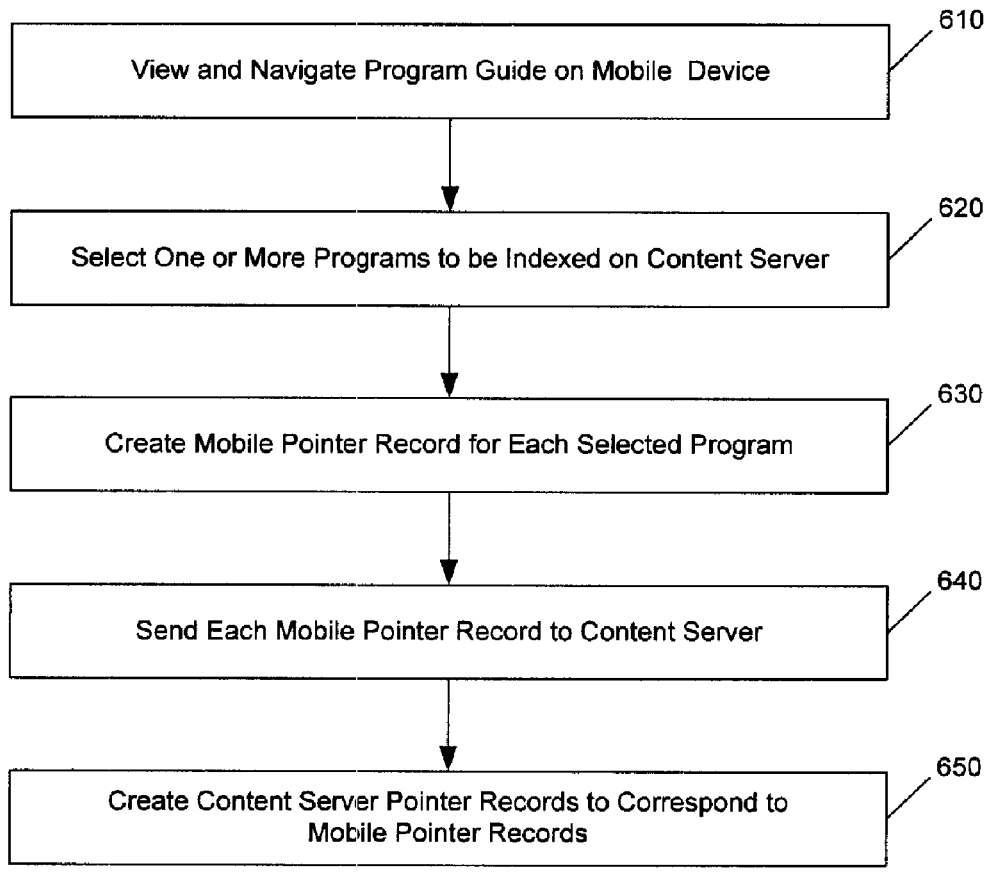
FIG. 6 is a flow chart describing a method of creating and storing pointers in accordance with an embodiment of the present invention.
Figure 7:
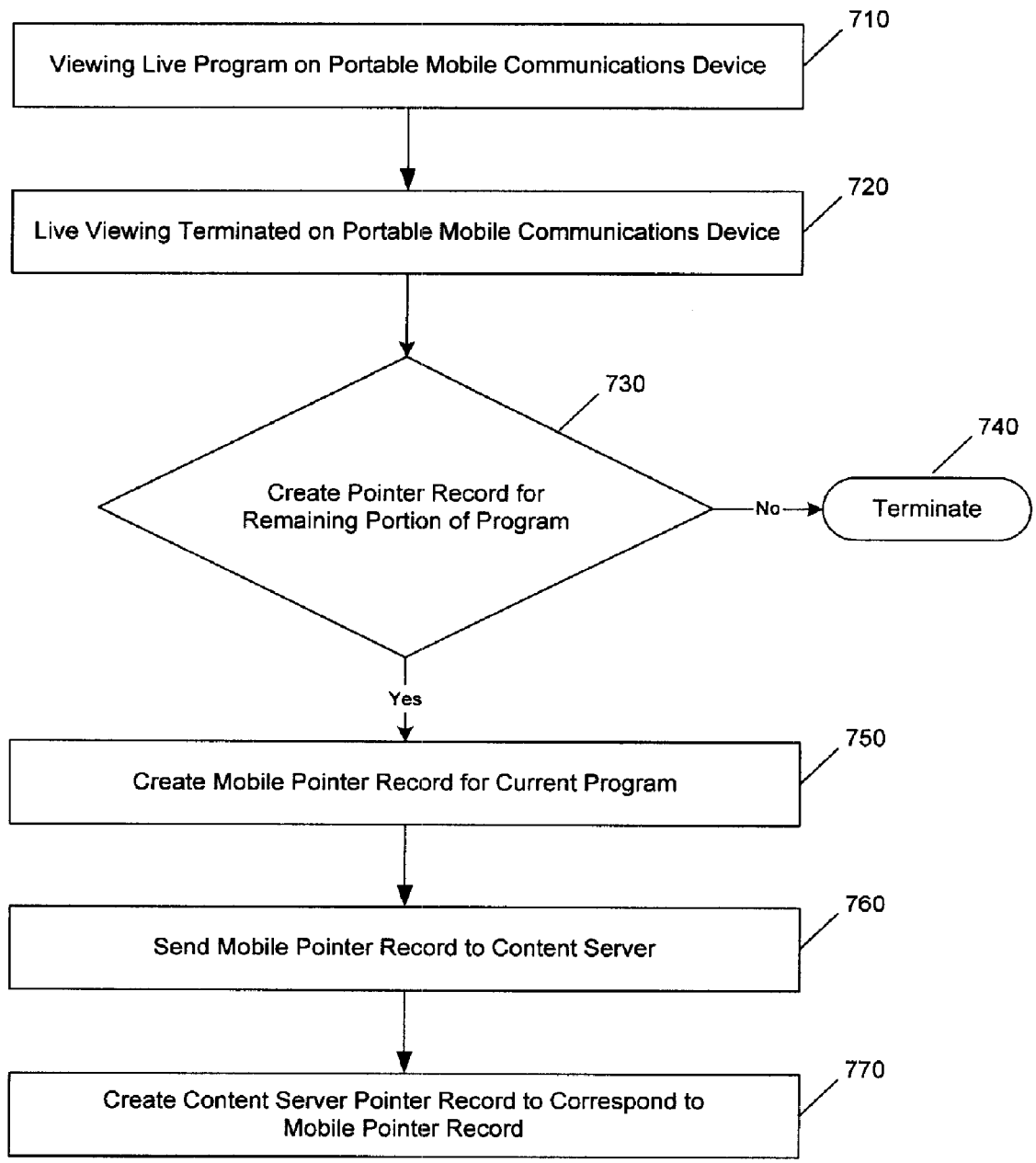
FIG. 7 is a flow chart describing a method of creating and storing pointers in accordance with another embodiment of the present invention.

FIG. 6 is a flow chart describing a method of creating and storing pointers in accordance with an embodiment of the present invention. In block 610, the user/viewer navigates the portable mobile communications device to a program guide that lists programming available to the user/viewer as shown in FIG. 5. The user/viewer can scroll up and down vertically to display additional channels or horizontally to display different time ranges. In block 620, the user/viewer can then select from among the programs displayed by the program guide. In block 630, the portable mobile communications device start/stop pointer application creates a mobile pointer record for the selected program. The mobile pointer record contains data and is formatted like the pointer record shown in FIG. 4. It is important to note, however, that the exact data and parameters that comprise the pointer records of the present invention can vary. One of ordinary skill in the art can change the record structure without departing from the Once the mobile pointer record has been created, the portable mobile communications device will send the mobile pointer record to the content server in block 640. In block 650, the content server then creates a corresponding or matching pointer record that is stored and can be used as index points for specific content to be delivered upon a request at a later date.

The foregoing has been described using an electronic program guide to select and create pointer records. Pointer records may also be created without the assistance of an electronic program guide so long as the user/viewer is able to provide the information associated with each pointer. For instance, the portable mobile communications device start/stop application can prompt the user for information including viewer identification, channel identifier, start_time, and stop_time. Thus, the user can answer the prompts with information like 9195551234 (viewer identification number which can also be the mobile phone telephone number), ESPN and 1:00 AM, 2:00 AM. This information can then be used to create a portable mobile communications device pointer. Moreover, a user/viewer may only wish to see a subset of an entire program. For instance, ESPN Sportscenter habitually will reserve the last five minutes of the program for "Plays of the Day". A user/viewer can create a pointer for this subset by specifying a start_time that is five minutes from the stop_time.

FIG. 6 is a flow chart describing a method of creating and storing pointers in accordance with an embodiment of the present invention. In block 710, the portable mobile communications device is displaying a live program. The user/viewer then terminates the broadcast for whatever reason in block 720. Prior to complete termination, the start/stop application prompts the user/viewer if he wishes to store the remainder of the broadcast in block 730. If the response to the prompt is negative then the process terminates 740. Otherwise, if the user/viewer would like to store the remainder of the program, a mobile pointer record is created in block 750. The mobile pointer record will use as a start_time the point of termination of the live broadcast. Once the mobile pointer record has been created, the portable mobile communications device will send the mobile pointer record to the content server in block 760. In block 770, the content server then creates a corresponding or matching pointer record that is stored and can be used as index points for specific content to be delivered upon a request at a later date.

FIG. 8 is a flow chart describing a method of manipulating pointers in accordance with an embodiment of the present invention. In block 810, the user/viewer navigates the start/stop application user interface to find the list of saved mobile record pointers. The list is displayed in a fashion like that shown in FIG. 5. In block 820, the user/viewer highlights a program and opts to either select it for viewing or delete it from the list. If the user/viewer opts to select it for viewing, a request is sent from the portable mobile communications device to the content server in block 830. The request contains the portable mobile communications device pointer record that is to be matched with the content server pointer record. In block 840, the content server finds the content to be delivered according to the matching pointer records and begins delivering the content to the portable mobile communications device. The content will continue to be delivered until the user/viewer terminates the delivery or the program is completed. If the user/viewer causes an early termination 850 the portable mobile communications device start/stop application prompts the user/viewer if he wishes to reset the start_time 860 to the time at which early termination occurred. If the user/viewer's response is affirmative then the mobile pointer record and content server pointer record are updated to reflect the new starting time. If user/viewer opts not to reset the start_time or if the program terminated upon completion, the start/stop application prompts the user/viewer if he wishes to delete the pointer to the program in block 880. If the user/viewer opts not to delete then no changes are made to the pointer and control is returned to the mobile pointer records list display in block 810. If the user/viewer decides to delete the program just watched, then both the mobile pointer record and content server record are deleted in blocks 880 and 890 respectively.

Any prompts associated with the invention may be presented and responded to via an interactive voice feature, a graphical user interface (GUI) presented on the display of the portable mobile communications device or the like.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention may have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of receiving content on a portable mobile communications device from a mobile TV service provider, the method comprising:
   creating and storing a mobile pointer record within the portable mobile communications device, the mobile pointer record containing data that identifies content to be delivered at a later date from the mobile TV service provider to the portable mobile communications device responsive to a subsequent request from the portable mobile communications device;
   sending the mobile pointer record data to a content server maintained by the mobile TV service provider; and
   creating and storing a content server pointer record within the content server that corresponds to the mobile pointer record such that the mobile TV service provider can associate the content server pointer record with stored content;
   such that when the request is sent to the mobile TV service provider from the portable mobile communications device by selecting the mobile pointer record for the content, the mobile TV service provider identifies the content via the content server pointer record and delivers the requested stored content to the portable mobile communications device,
   wherein the mobile pointer record includes data records that identify the portable mobile communications device, a channel associated with the content, a program name for the content, and a pointer number, and
   wherein when a start time and a stop time are included in the mobile pointer record, the start time designated at the portable mobile communications device designates when a desired portion of the content is scheduled to be delivered, and the stop time designated at the portable mobile communications device designates when the desired portion of the content is scheduled to complete delivery, and when the start time and the stop time are not designated the entire content is desired and the start time and the stop time being derived from an electronic program guide.

2. The method of claim 1 wherein the content server pointer record includes data records that identify the portable mobile communications device, the channel associated with the content, a pointer number, a start time for when the content is scheduled to be delivered, and a stop time for when the content is scheduled to complete delivery.

3. The method of claim 1 wherein the mobile pointer record is created, in part, by selecting the content from an electronic program guide, wherein the electronic program guide supplies the program name data, channel data, start time, and stop time for the selected content.

4. The method of claim 1 wherein the mobile pointer record is created in the portable mobile communications device, in part, by receiving, via a user interface, input that identifies the channel associated with the content, a program name for the content, a start time identifying when the content is desired to begin delivery, and a stop time identifying when the content is desired to complete delivery.

5. The method of claim 4 wherein a mobile pointer record can be created in the portable mobile communications device for the remainder of content that is currently being displayed prior to terminating the current display of content.

6. A portable mobile communications device for creating and storing a mobile pointer record, the mobile pointer record containing data that identifies content to be delivered at a later date from a mobile TV service provider to the portable mobile communications device responsive to a subsequent request from the portable mobile communications device, such that when the request to deliver content associated with the mobile pointer record is sent to the mobile TV service provider from the portable mobile communications device by selecting the mobile pointer record via a user interface, the mobile TV service provider identifies and delivers the requested stored content to the portable mobile communications device,
   wherein the mobile pointer record includes data records that identify the portable mobile communications device, a channel associated with the content, a program name for the content, and a pointer number, and
   wherein when a start time and a stop time are included in the mobile pointer record, the start time designated at the portable mobile communications device designates when a desired portion of the content is scheduled to be delivered, and the stop time designated at the portable mobile communications device designates when the desired portion of the content is scheduled to complete delivery, and when the start time and the stop time are not designated the entire content is desired and the start time and the stop time being derived from an electronic program guide.

7. The portable mobile communications device of claim 6 wherein the mobile pointer record is created, in part, by selecting the content from an electronic program guide, wherein the electronic program guide supplies the program name data, channel data, start time, and stop time for the selected content.

8. The portable mobile communications device of claim 6 wherein the mobile pointer record is created, in part, by receiving, via a user interface, input that identifies the channel associated with the content, a program name for the content, a start time identifying when the content is desired to begin delivery, and a stop time identifying when the content is desired to complete delivery.

9. The portable mobile communications device of claim 6 wherein a mobile pointer record can be created in the portable mobile communications device for the remainder of content that is currently being displayed prior to terminating the current display of content.

10. A computer program product embodied on a computer readable storage medium for of receiving content on a portable mobile communications device from a mobile TV service provider, the computer program product comprising:
   computer program code for creating and storing a mobile pointer record within the portable mobile communications device, the mobile pointer record containing data that identifies content to be delivered at a later date from the mobile TV service provider to the portable mobile communications device responsive to a subsequent request from the portable mobile communications device;
   computer program code for sending the mobile pointer record data to a content server maintained by the mobile TV service provider; and
   computer program code for creating and storing a content server pointer record within the content server that corresponds to the mobile pointer record such that the mobile TV service provider can associate the content server pointer record with stored content; such that when the request is sent to the mobile TV service provider from the portable mobile communications device by selecting the mobile pointer record for the content, the mobile TV service provider identifies the content via the content server pointer record and delivers the requested stored content to the portable mobile communications device, wherein the mobile pointer record includes data records that identify the portable mobile communications device, a channel associated with the content, a program name for the content, and a pointer number, and wherein when a start time and a stop time are included in the mobile pointer record, the start time designated at the portable mobile communications device designates when a desired portion of the content is scheduled to be delivered, and the stop time designated at the portable mobile communications device designates when the desired portion of the content is scheduled to complete delivery, and when the start time and the stop time are not designated the entire content is desired and the start time and the stop time being derived from an electronic program guide.

11. The computer program product embodied on a computer readable storage medium of claim 10 wherein the content server pointer record includes data records that identify the portable mobile communications device, the channel associated with the content, a pointer number, a start time for when the content is scheduled to be delivered, and a stop time for when the content is scheduled to complete delivery.

12. The computer program product embodied on a computer readable storage medium of claim 10 wherein the mobile pointer record is created, in part, by selecting the content from an electronic program guide, wherein the electronic program guide supplies the program name data, channel data, start time, and stop time for the selected content.

13. The computer program product embodied on a computer readable storage medium of claim 10 wherein the mobile pointer record is created in the portable mobile communications device, in part, by receiving, via a user interface, input that identifies the channel associated with the content, a program name for the content, a start time identifying when the content is desired to begin delivery, and a stop time identifying when the content is desired to complete delivery.

14. The computer program product embodied on a computer readable storage medium of claim 13 wherein a mobile pointer record can be created in the portable mobile communications device for the remainder of content that is currently being displayed prior to terminating the current display of content.

* * * * *